(12) United States Patent
van der Steur et al.

(10) Patent No.: US 8,973,848 B2
(45) Date of Patent: Mar. 10, 2015

(54) COMPOSITE AIR BEARING ASSEMBLY

(71) Applicants: Gunnar van der Steur, Chesapeake City, MD (US); Joseph Cichocki, Newark, DE (US)

(72) Inventors: Gunnar van der Steur, Chesapeake City, MD (US); Joseph Cichocki, Newark, DE (US)

(73) Assignee: EFC Systems, Inc., Havre de Grace, MD (US)

( * ) Notice: Subject to any disclaimer, the term of this patent is extended or adjusted under 35 U.S.C. 154(b) by 0 days.

(21) Appl. No.: 14/479,481

(22) Filed: Sep. 8, 2014

(65) Prior Publication Data
US 2014/0374506 A1    Dec. 25, 2014

(51) Int. Cl.
*B05B 3/10* (2006.01)
*F16C 31/06* (2006.01)
*B05B 3/04* (2006.01)
*B05B 7/02* (2006.01)
*F16C 32/06* (2006.01)

(52) U.S. Cl.
CPC ............... *B05B 3/0409* (2013.01); *B05B 7/02* (2013.01); *F16C 32/0618* (2013.01)
USPC ............ 239/223; 384/100; 384/114; 384/119

(58) Field of Classification Search
USPC ......... 239/223, 224, 240, 263, 700, 701, 703, 239/DIG. 14; 384/100, 107, 114, 115, 119, 384/120; 415/170.1; 433/132
See application file for complete search history.

(56) References Cited

U.S. PATENT DOCUMENTS

| | | | |
|---|---|---|---|
| 3,969,822 A | 7/1976 | Fukuyama | |
| 4,368,853 A | 1/1983 | Morishita et al. | |
| 4,887,770 A | 12/1989 | Wacker et al. | |
| 4,899,936 A | 2/1990 | Weinstein | |
| 4,928,883 A | 5/1990 | Weinstein | |
| 4,936,507 A | 6/1990 | Weinstein | |
| 4,936,509 A | 6/1990 | Weinstein | |
| 4,936,510 A | 6/1990 | Weinstein | |
| 4,997,130 A | 3/1991 | Weinstein | |
| 5,788,164 A | 8/1998 | Tomita et al. | |
| 5,803,372 A | 9/1998 | Weinstein et al. | |
| 6,328,475 B1 * | 12/2001 | Jager | 384/107 |
| 6,428,210 B1 | 8/2002 | Kafai | |
| 2001/0008257 A1 * | 7/2001 | Scholz et al. | 239/703 |
| 2002/0038827 A1 * | 4/2002 | Fujii et al. | 239/700 |
| 2003/0001032 A1 * | 1/2003 | Reichler | 239/703 |
| 2009/0285514 A1 * | 11/2009 | Hori et al. | 384/107 |

* cited by examiner

*Primary Examiner* — Darren W Gorman
(74) *Attorney, Agent, or Firm* — E. Alan Uebler, PA

(57) ABSTRACT

An air bearing assembly supporting a turbine driven rotatable motor shaft is provided. The assembly includes a composite cylindrical air bearing having alternating, bonded segmented porous carbon sections and nonporous carbon sections. The composite bearing has a sleeve installed circumferentially therearound. The sleeve has openings therein, therethrough and therearound such that the openings are adjacent the porous carbon sections and are oriented so as to be in longitudinal and circumferential registry with the porous carbon sections. Air passageways deliver supplied air into and through the sleeve openings, thence into and through the porous sections, thereby providing frictionless support for the rotating shaft. The assembly includes "O"-rings installed circumferentially therearound, one at each end of the assembly. A specific embodiment, namely a rotary bell cup atomizer driven by a turbine mounted on a rotatable motor shaft supported by the air bearing assembly, is disclosed and claimed.

12 Claims, 4 Drawing Sheets

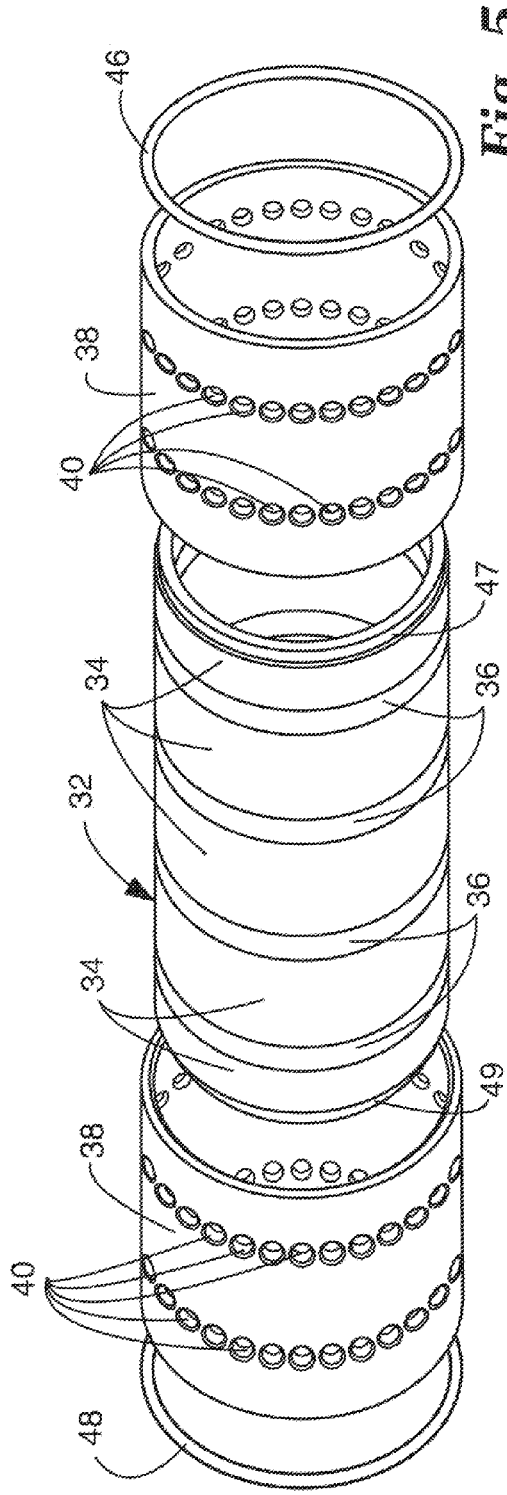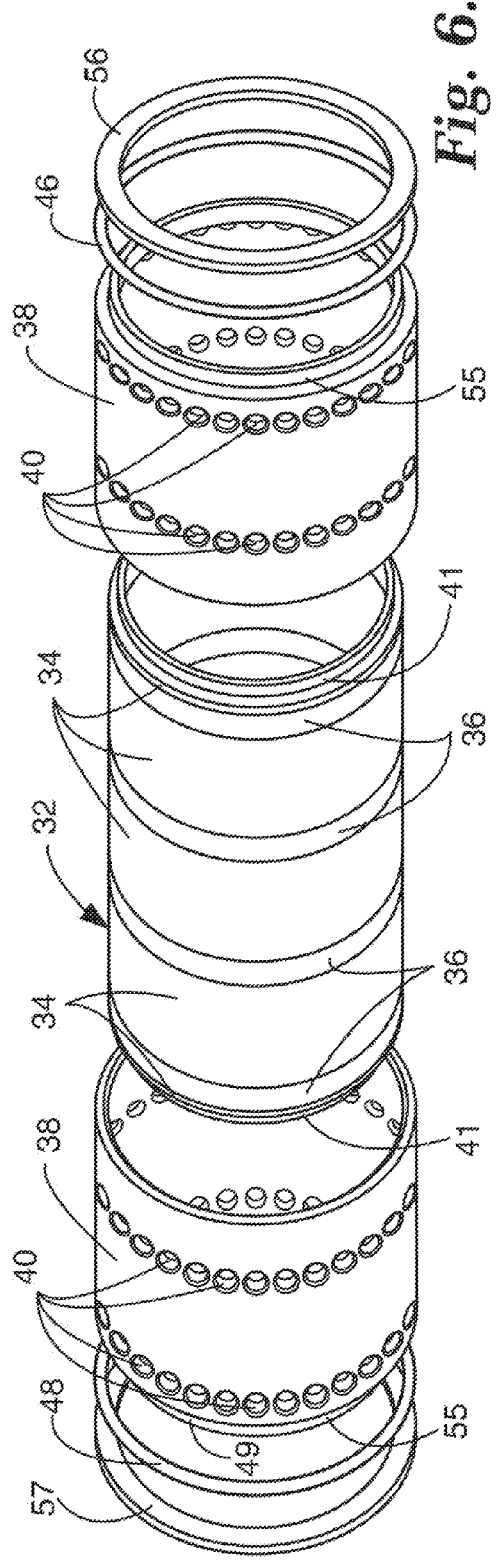

COMPOSITE AIR BEARING ASSEMBLY

FIELD OF THE INVENTION

The present invention relates to cylindrical air bearings used to support rotating, driven shafts. More specifically, the invention relates to an air bearing assembly including a carbon composite cylindrical air bearing having at least one perforated sleeve installed thereover, the assembly including "O-rings" installed circumferentially therearound, one at the distal end and one at the proximal end thereof, the assembly contained in a housing and useful for supporting a rotating driven shaft.

BACKGROUND OF THE INVENTION

Air bearings are known, both of the orifice type and constructed of inherently porous materials such as porous, sintered metals or ceramics, porous synthetic resins, and porous carbon. Air bearings are employed in a wide range of applications, from gas turbine engines to precision machinery, to ink jet printers, to high-speed dental drills. One field in which air bearings have received widespread use is in the robotically controlled painting of vehicles by high-speed rotary bell cup atomizers. While the invention herein may be used in a wide variety of air bearing applications, for reasons of descriptive efficiency and expedience, the detailed principles underlying the operation of the invention and the apparatus employed will be presented with a focus on its use in rotary bell cup atomizers for applying paint to workpieces.

Known rotary atomizers can include a rotating bell cup having a generally conical front flow surface extending between an inner, axially central paint supply orifice opening and a radially outer atomizing edge. Paint entering the bell cup through the central opening flows to the rear surface of a deflector and is disbursed radially outwardly towards the front diverging flow surface of the bell cup, flowing thereover to the outer edge of the cup where it is atomized to a fine mist and applied to the workpiece.

Atomization is effected by centrifugal forces produced when the cup, mounted on a central motor shaft, is rotated at high speeds, typically at 60-80,000 RPM.

Rotary bell cup atomizers are used in liquid based paint coating operations and also in powder coating operations. The invention herein described and claimed is useful in both types. In such operations, electrostatic charging is applied to the atomized particles to enhance their attraction to the grounded substrate and produce a flawless finish, all of which is well known.

An early example of the use of an air bearing to support the central rotating motor shaft of an electrostatic spray painting device is found in U.S. Pat. No. 4,368,853 (1983, assigned to Toyota, K.K.) Therein, a rotary electrostatic spray painting device is disclosed comprising a rotary shaft and a spray head fixed onto the front end of the rotary shaft. Paint is fed onto the cup shaped inner wall of the spray head. The rotary shaft is supported by a single thrust air bearing and a pair of radial air bearings. The rotating motor shaft is supported by air injected through porous air bearings which enable the shaft to rotate at high rotational speeds, said to be up to 80,000 RPM, in a substantially frictionless environment. While porous air bearings are said to be useful, the reference cites no specific material of construction of any bearing.

Illustrating the diversity of applications in which air bearings find use, U.S. Pat. No. 3,969,822 discloses a porous, static pressure air bearing device for use in a dentist's handpiece. Therein, the porous, static pressure air bearing device includes a rotatable shaft for mounting thereon a cutting tool, a bearing case, an air bearing portion provided in the bearing case for supporting the rotatable shaft, and a turbine blade formed integrally with the shaft or mounted on the shaft. The air bearing portion is formed of porous material, and the reference cites sintered porous metal or ceramics, or porous synthetic resins, as suitable bearing materials. As disclosed in the '822 reference, sleeves of inverted L-shaped or L-shaped cross section are secured to the rotatable shaft such that the sleeves are in contact with the turbine blade and mounted on the outer diameter surface of the rotatable shaft. These sleeves may be formed integrally with the rotatable shaft or manufactured separately from the shaft for convenience of working. Air supplied through the air supply passage is injected against the turbine blade to rotate the rotatable shaft with the sleeves. The shaft is said to assume a high speed of rotation because it is supported by air bearings of low friction. Since the bearing portion is supported by O-rings, the damping effect provided thereby acts to absorb vibrations occurring in the rotatable shaft during its shift from an initial rotation to high-speed rotation.

It will be seen that air bearings constructed of various combinations of porous and non-porous materials (having orifices), sleeves, and "O"-rings are disclosed in the known prior art. However, the air bearing assembly disclosed and claimed herein, which provides its inherent and significant advantages over prior bearings, all to be described hereinbelow, is nowhere disclosed in the known prior art.

SUMMARY OF THE INVENTION

An air bearing assembly for use with a turbine driven rotatable motor shaft is provided. The assembly is contained within a housing and an external air supply for supplying air to actuate the turbine is provided. The air bearing assembly includes a composite cylindrical air bearing supporting the motor shaft, the composite cylindrical air bearing having alternating segmented porous carbon sections and nonporous carbon sections bonded together. The composite bearing has at least one sleeve installed externally and circumferentially about the composite cylindrical air bearing, the sleeve having openings formed therein, therethrough and therearound such that the openings are adjacent the porous carbon sections and are oriented so as to be in longitudinal and circumferential registry with the adjacent porous carbon sections. The housing includes air passageways for delivering air externally of the sleeve into and through each sleeve opening. The assembly includes "O"-rings installed circumferentially therearound, one at the distal end and one at the proximal end of the assembly.

In operation, air supplied to the assembly is delivered through the air passageways, to and through the openings in the sleeve, and to and through the porous carbon sections of the composite cylindrical air bearing. Upon supplying sufficient air to actuate the turbine, to and through the passageways, and thence to and through the porous sections of the composite cylindrical air bearing, the rotatable turbine drives the motor shaft which is supported within the bearing assembly during rotation in a substantially frictionless environment, and the "O"-rings provide vibration damping of the motor shaft during rotation.

The "O"-rings may be installed externally and circumferentially immediately adjacent the composite cylindrical air bearing or, alternatively, the "O"-rings may be installed externally and circumferentially immediately adjacent the at least one sleeve.

Preferably the air bearing assembly is configured such that the at least one sleeve is formed of two half-sleeves installed in longitudinal abutting relationship externally and circumferentially about the composite cylindrical air bearing, one fore and one aft, over the composite cylindrical air bearing.

In a specific embodiment, a rotary bell cup atomizer driven by a turbine mounted on a rotatable motor shaft supported by this air bearing assembly and contained within a housing is provided. The invention is described hereinbelow with reference to this specific embodiment for convenience in presenting fundamental details of operation, but it will be clear to one skilled in the art that the air bearing assembly may be used in other applications in which a non-contacting, extremely low friction air bearing is required or desired.

In the air bearing assembly, the sleeve(s) is (are) preferably constructed of steel, most preferably stainless steel.

BRIEF DESCRIPTION OF THE DRAWINGS

In the accompanying figures:

FIG. 5 is an exploded perspective view of the elements of the air bearing assembly of the invention.

FIG. 6 is an exploded perspective view of an alternate embodiment of the invention, showing the elements thereof.

DETAILED DESCRIPTION OF THE INVENTION AND PREFERRED EMBODIMENTS WITH REFERENCE TO THE DRAWINGS

An air bearing assembly supporting a turbine driven rotatable motor shaft is provided. The assembly includes a composite cylindrical air bearing having alternating, bonded segmented porous carbon sections and nonporous carbon sections. The composite bearing has a sleeve installed circumferentially therearound. The sleeve has openings therein, therethrough and therearound such that the openings are adjacent the porous carbon sections and are oriented so as to be in longitudinal and circumferential registry with the porous carbon sections. Air passageways deliver supplied air into and through the sleeve openings, thence into and through the porous sections, thereby providing frictionless support for the rotating shaft. The assembly includes "O"-rings installed circumferentially therearound, one at each end of the assembly. A specific embodiment, namely a rotary bell cup atomizer driven by a turbine mounted on a rotatable motor shaft supported by the air bearing assembly, is disclosed and claimed.

While the invention herein is generally directed to an air bearing assembly for use with a turbine driven rotatable motor shaft, and is useful in a wide range of applications, for expediency in describing the details of the underlying principles of operation and the specific structural elements and their interactions, those details will be described below with reference to specific apparatus in which this bearing assembly is especially suited, namely a turbine driven rotary bell cup atomizer used, for example, in the painting of automobiles and other vehicles.

In certain prior rotary bell cup atomizers, the bell cup is affixed to a turbine driven motor shaft, the motor shaft passes through and is supported within a cylindrical bearing having small orifices (holes) drilled through the bearing walls and through which compressed air is forced under high pressure forming a defined gap between the inner wall of the bearing and the shaft and causing the motor shaft to "float" within the bearing in a substantially frictionless environment.

In addition, other prior air bearings have been constructed of solid, nonporous carbon having orifices drilled therein and, alternatively, of porous carbon which, because of its specific porosity and increased surface area, the substantial volume of air needed to prevent the rotating shaft from contacting the bearing is reduced.

Figure 1:
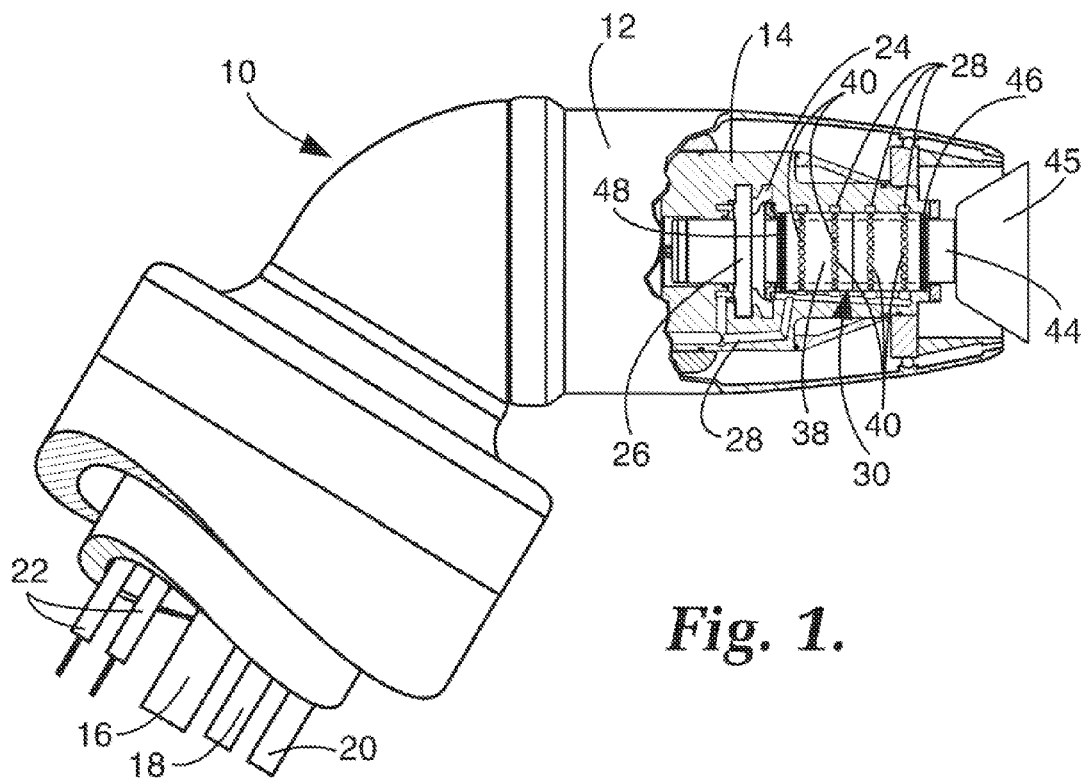
FIG. 1 is an elevational view, partially broken away and in cross-section, of the air bearing assembly of the invention, specifically depicting the assembly as employed in rotary bell cup atomizing apparatus.

Focusing on the invention presented herein, a detailed description thereof will be given with reference to the accompanying drawings, wherein FIG. 1 is a side elevation, partially broken away and partially in cross-section, of the air bearing assembly 30 of the invention incorporated in the rotary atomizing apparatus 10. The apparatus includes external housing 12 which contains the bearing housing 14 which houses the air bearing assembly 30 through which the rotating motor shaft 44 extends. In this embodiment, a bell cup paint applicator 45 is shown schematically, affixed to the distal end of motor shaft 44.

The rotary atomizer 10 is supplied with paint via paint supply line 16, compressed air via air supply line 18, and, when required, cleaning solvent through solvent supply line 20. Electrical power for imparting electrical charges to atomized paint is supplied via electrical conduits 22.

The compressed air supplied is channeled to and through air passageways 24 and 28 to drive turbine 26 and to channel air through housing 14 as shown to the outer surface of the bearing assembly 30. The bearing assembly 30 includes the composite cylindrical carbon air bearing 32 (not seen in this view) which is contained within sleeve 38, the sleeve 38 having a plurality of openings 40 through the walls thereof, the openings 40 extending circumferentially around the sleeve as shown and being in connecting registry with their respective passageways 28 through which air is supplied.

"O"-rings 46 and 48 are positioned around the air bearing assembly 30, one at the distal end and one at the proximal end thereof, respectively, as shown, within housing 14, the "O"-rings serving to allow for small bearing movements and effectively dampen vibrations produced by bell cup imbalance which can occur at the very high rotations encountered in such operations, thereby stabilizing the system.

Figure 2:
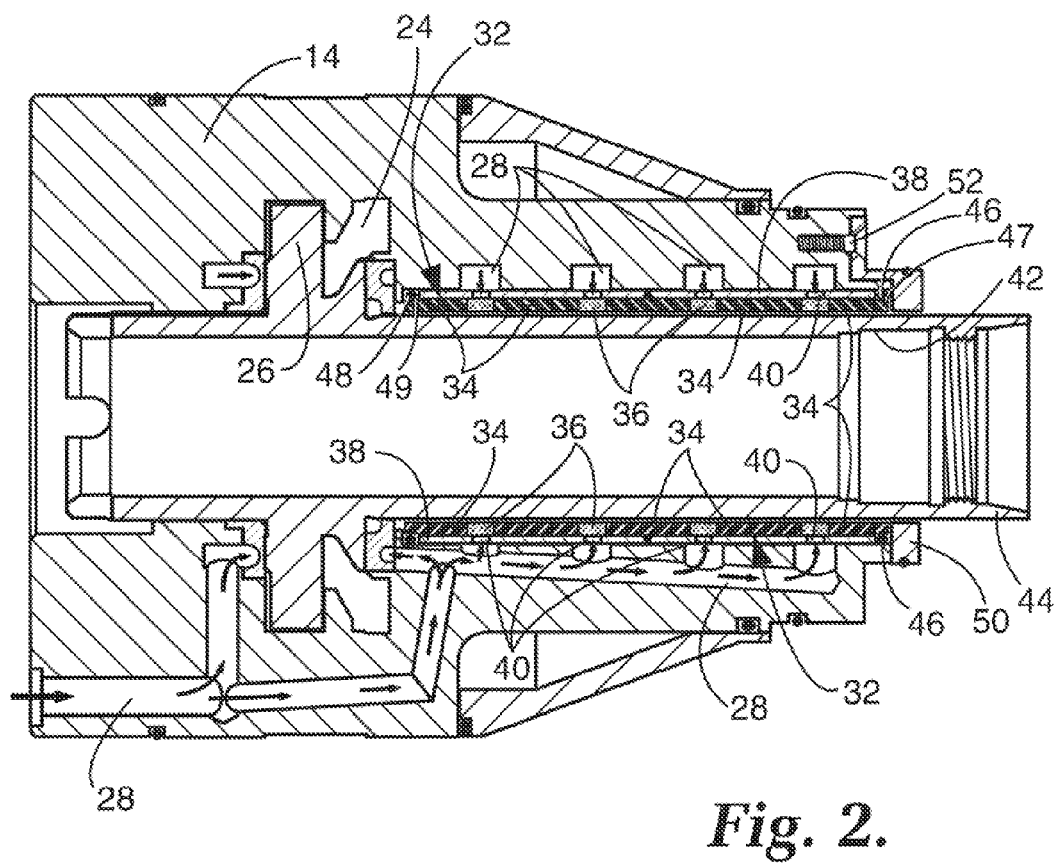
FIG. 2 is a side elevation in cross-section, of a preferred embodiment of the air bearing assembly of the invention.

FIG. 2 depicts, in cross-section, the air-bearing assembly according to the invention and corresponding to the rotary atomizer shown in FIG. 1. In FIG. 2, the air bearing assembly 30 is shown housed within bearing housing 14 and includes composite segmented cylindrical carbon air bearing 32 overwrapped circumferentially by sleeve(s) 38 and having "O"-rings 46 and 48 installed around the assembly, one at the distal end and one at the proximal end, respectively, supporting, in operation, the rotating motor shaft 44. The composite cylindrical carbon air bearing 32 is constructed having alternating nonporous carbon segments 34 and porous carbon segments 36 bonded together to form the composite bearing 32. Four porous segments 36 and five nonporous segments 34 are depicted, but the numbers of alternating segments can vary depending on the circumstances and requirements of the application. In a specific application, nonporous segments of approximately 0.5 inch width and porous segments of 0.125 inch width (approximately) were found effective in a bearing having an ID of 1.023 inches.

Over-wrapping the composite carbon air bearing 32 is sleeve 38, shown in the figure as separate half-sleeves 38, being a preferred embodiment. The sleeve 38 is preferably constructed of stainless steel and, while a single sleeve will be effective, considering the extremely small gap distance between the carbon bearing ID and the motor shaft OD, two half-sleeves 38 are preferred as being less difficult to precision manufacture, given the overall length of the bearing and its thickness, together with ease of maintaining concentricity and straightness, all to be described in detail below, Sleeve(s) 38 have circumferential openings 40 drilled therethrough and therearound as shown, which openings are positioned such that, on installation overwrapping the adjacent composite bearing 32, openings 40 are aligned over each of their respective porous adjacent carbon segments 36 of the bearing 32.

Air entering the apparatus is guided through channel 24, to drive turbine 26, and to and through air passageways 28, within bearing housing 14, all as depicted in FIG. 2. Housing 14 is constructed such that air passageways 28 lead to and extend around the bearing assembly such that one passageway 28 is aligned longitudinally with each row of circumferential openings 40 in sleeve(s) 38, thereby placing the porous respective carbon segments 36, the sleeve openings 40, and the air passageways 28 all in longitudinal and circumferential registry.

For completeness of the detail shown in FIG. 2, the "O"-rings 46, 48 are installed in seats 47, 49 at the distal and proximal ends of the bearing assembly 32, respectively. The "O"-rings are preferably of a perfluoroelastomer material, and other inert materials may be suitable for particular environments.

The bearing assembly is insertable into housing 14, facilitating the installation thereof, and secured therein by end cap 50 affixed to housing 14 by bolts 52. Upon introduction of sufficient air, the turbine driven motor shaft 44 is supported within the bearing assembly 32 and rotates within a substantially frictionless environment inside the bearing, a typical gap distance between the ID of bearing 32 and the OD of motor shaft 44 being 0.0007"±0.0001", although this gap can vary depending on the specific application in which the bearing is employed, as will be understood by those skilled in the art.

Figures 3, 4:
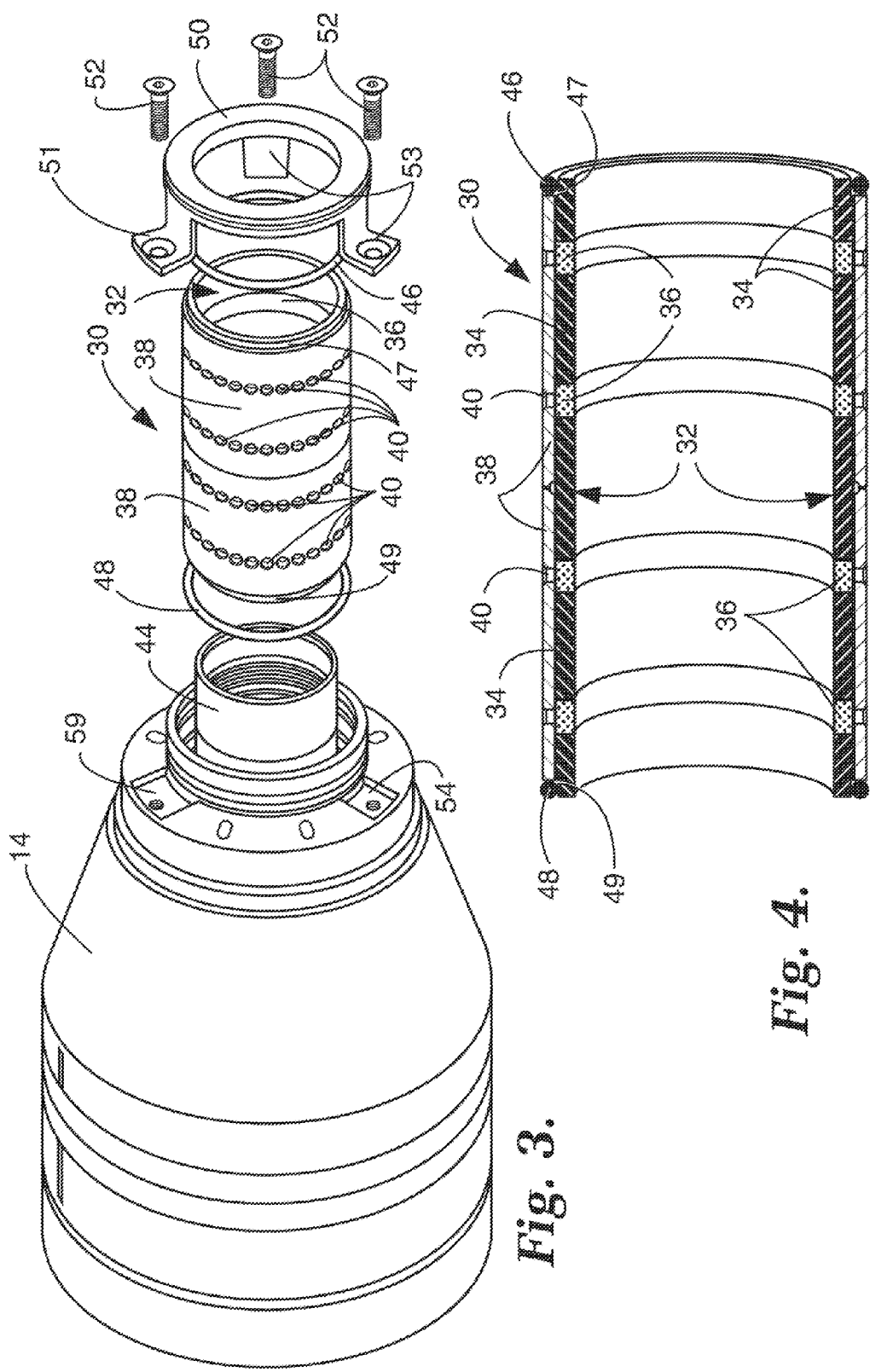
FIG. 3 is an exploded perspective view of the preferred embodiment of the invention depicted in FIG. 2.
FIG. 4 shows a cross-section of the preferred composite cylindrical air bearing of the invention having alternating segmented porous carbon sections and nonporous carbon sections bonded together.

FIG. 3 is an exploded perspective view of a preferred embodiment of the air bearing assembly 30 of the invention. Therein, insertable into bearing housing 14 and over motor shaft 44, is the composite carbon air bearing 32, wherein only one of the porous carbon segments 36 is visible internally thereof. Overwrapping the composite segmented carbon air bearing 32 are half-sleeves 38 containing circumferential openings 40 therearound, all openings 40 being in adjacent registry with respective porous carbon segments 36. Proximal "O"-ring 48 is shown installable in proximal seat or groove 49 and distal "O"-ring 46 is shown installable in distal seat or groove 47 over the respective ends of the carbon composite 32. The combined length of the two half-sleeves 38 is adjusted as shown to accommodate this configuration, as discussed further below. Completing the assembly is end-cap 50, which secures the bearing assembly 30 to the housing 14 by screws 52 insertable as shown through tabs 51, 53 which fit into tab receptacles 59, 54, respectively. For alignment purposes, tab 51 is shown wider than tabs 53 and receptacle 59 is wider than receptacles 54. Tab 51 is received in receptacle 59, providing for ease of alignment and realignment of components.

FIG. 4 is a cross-sectional view of the preferred composite cylindrical air bearing assembly 30 depicted in FIG. 3, which includes the nonporous carbon segments 34 bonded to porous carbon segments 36, four of which are shown in the figure, by a carbon bonding agent to be described below, all forming the segmented composite carbon bearing 32. Completing the bearing assembly, the two half-sleeves 38, preferably stainless steel, having circumferential openings 40 in registry with their respective adjacent porous carbon segments, overwrap the bearing 32. The carbon bearing 32 and sleeve(s) 38 need not be, and preferably are not, bonded together. Completing the assembly are "O"-rings 48, 46 mounted proximally and distally in respective seats 49, 47 adjacent the carbon bearing 32.

FIG. 5 is an exploded perspective view of a preferred embodiment of the air bearing assembly of the invention which illustrates the basic elements thereof. In FIG. 5, the composite carbon air bearing 32 includes solid carbon segments 34 bonded to porous carbon segments 36 as shown. Details of the bonds are presented below. In this embodiment, the sleeve overwrapping the carbon composite 32 is composed of two half-sleeves 38 as illustrated. Multiple openings 40 are formed in each half-sleeve 38 such that, upon assembly of the components as shown in FIG. 4, the openings 40 are all in longitudinal and circumferential registry with their respective adjacent porous carbon segments 36. The bearing assembly is completed by the installation of the proximal "O"-ring 48 over the composite carbon bearing 32 at its proximal end, inserted into proximal "O"-ring seat or groove 49, and distal "O"-ring 46 over the composite carbon bearing 32 at its distal end into distal "O"-ring seat or groove 47. The bearing assembly thus constructed is then insertable into bearing housing 14 as shown in FIG. 3.

An alternate embodiment of the invention is shown in FIG. 6, in which the identically numbered components function identically as illustrated in FIG. 5, except that the vibration-damping "O"-rings in this embodiment are installed over the proximal and distal ends, respectively, of the half-sleeves 38 as shown. The distal "O"-ring 46 is installed into the step-down 55 in the distal end of the forward half-sleeve 38 and, similarly, the proximal "O"-ring 48 is installed into the step-down 55 in the proximal end of the aft half-sleeve 38, all of which will be seen in more detail in FIG. 8, described below. Securing the bearing assembly into the bearing housing is illustrated to be effected by retaining rings 56, 57 and end connectors (not shown in FIG. 6.).

Figure 7:
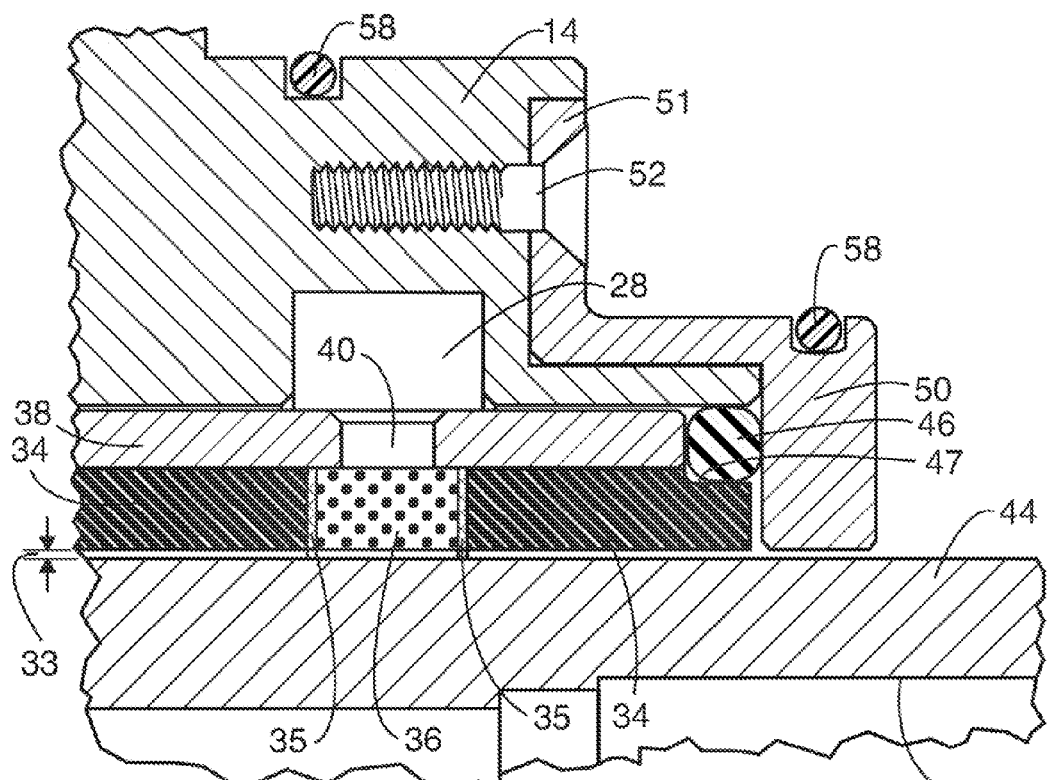
FIG. 7 depicts, in cross-section, the detail of a portion of the distal end of the air bearing assembly of the invention corresponding to the preferred embodiment shown in FIGS. 1-5.

FIG. 7 is a detailed cross-sectional view illustrating the connections among the various elements of the assembly at the distal end thereof according to the preferred embodiment shown in FIGS. 1-5. Therein, the distal end of the segmented composite carbon bearing having solid carbon segments 34 and a porous carbon segment 36 are shown bonded together at bond 35. A suitable bonding agent for this use is a carbon cement marketed by the SGL Group and designated "C-80". Overwrapping the carbon composite is sleeve 38 having opening 40 connecting to air passageway 28 which allows supplied air to pass from passageway 28 through opening 40, thence through the porous segment 36 and, in operation when sufficient air is supplied, supporting the rotating motor shaft 44 on a thin circumferential cushion of air, the air gap being designated at 33. This air gap 33 is typically quite thin, in the range of 0.0007 inch±0.0001 inch, as discussed above, but its magnitude can vary in various applications, as will be evident to a skilled artisan.

"O"-ring 46 in this embodiment is installed over the seat 47 in the distal end of the carbon bearing 30, the seat 47 formed in the forward-most carbon segment of the bearing as shown, with the overwrapped sleeve 38 dimensioned to accommodate this configuration. To complete the assembly, the bearing is secured in housing 14 by end cap 50 and screws 52 through tabs 51 (and 53, not shown), with sealing "O"-rings 58 shown for completeness.

Figure 8:
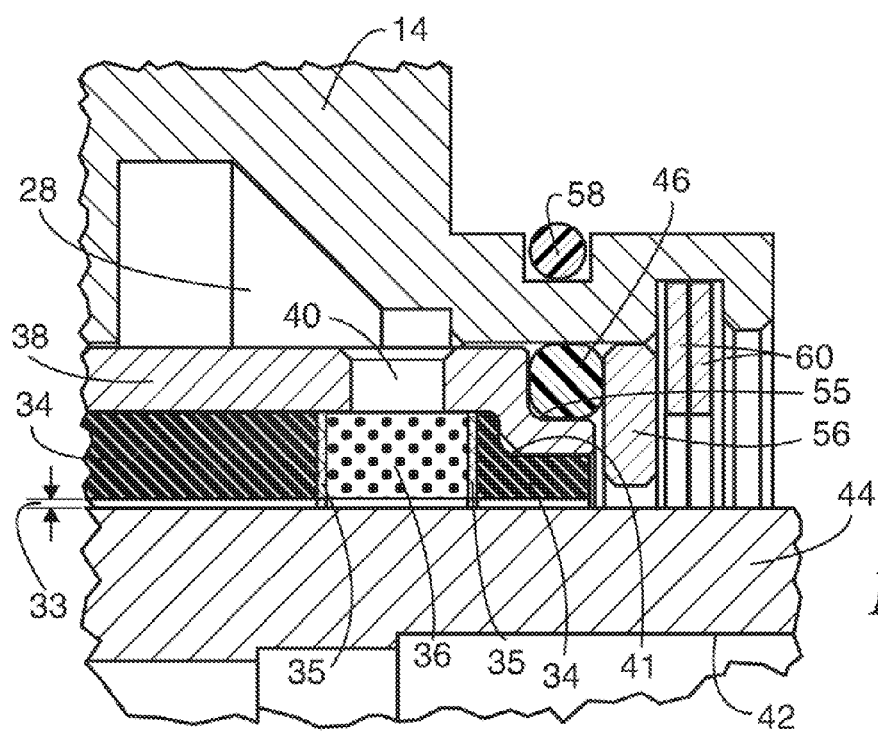
FIG. 8 depicts, in cross-section, the detail of a portion of the distal end of the air bearing assembly of the invention according to the aforementioned alternate embodiment shown in FIG. 6.

FIG. 8, like FIG. 7, illustrates a cross-sectional view of the connections among the various elements of the bearing assembly of the invention according to the alternate embodiment of FIG. 6 at the distal end thereof. As before, like elements in FIG. 8 function as in FIG. 7, and their descriptions need not be repeated. In FIG. 8, the "O"-ring 46 is shown installed over the distal end of sleeve 38 in the step-down 55 thereof. The underlying carbon bearing segment 34 is constructed with complimentary seat 41 therein to mate the two elements, with the assembly being secured in housing 14, as shown, by distal retaining ring 56 and split ring 60.

In operation, compressed air flowing to and through the bearing assembly of the invention fill the defined gap between the bearing ID and the OD of the turbine shaft. Inherent in this operation is a requirement for a substantial volume of air to flow to prevent the turbine shaft from contacting the bearing. Also inherent are vibrations produced by the very high speed rotation of the motor shaft. The bearing assembly of the invention dampens these vibrations as a result of the installation of the forward and aft "O"-rings. These "O"-rings allow the bearing to "float" within the housing cavity in support of the rotating shaft. The steel sleeve(s) strengthen the assembly and reduce the tendency of the carbon/carbon bonds to delaminate from, e.g., excessive vibration. In the same vein, the preferred half-sleeve construction has the practical advantage of ease of manufacture, given the extreme precision requirements of length, thickness and concentricity in maintaining the very small gap distances required in use of these bearings.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An air bearing assembly for use with a turbine driven rotatable motor shaft contained within a housing, and including an external air supply for supplying air to actuate the turbine, said air bearing assembly comprising a composite cylindrical air bearing supporting said motor shaft, said composite cylindrical air bearing having alternating segmented porous carbon sections and nonporous carbon sections bonded together, and having at least one sleeve installed externally and circumferentially about said composite cylindrical air bearing, said sleeve having openings formed therein, therethrough and therearound such that said openings are adjacent said porous carbon sections and are oriented so as to be in longitudinal and circumferential registry with said adjacent porous carbon sections, wherein said housing includes air passageways for delivering said air into and through each said opening externally of said sleeve, and wherein said assembly includes "O"-rings installed circumferentially around said assembly, one at the distal end and one at the proximal end of said assembly, whereby air supplied to said assembly is delivered through said passageways, to and through said openings in said sleeve, and to and through said porous carbon sections of said composite cylindrical air bearing, and whereby, upon supplying sufficient air to actuate said turbine, to and through said passageways, and thence to and through said porous sections of said composite cylindrical air bearing, said rotatable turbine drives said motor shaft which is supported within said bearing assembly during rotation, and said "O"-rings provide vibration damping of said motor shaft during rotation.

2. The air bearing assembly of claim 1 wherein said "O"-rings are installed externally and circumferentially immediately adjacent said composite cylindrical air bearing.

3. The air bearing assembly of claim 1 wherein said "O"-rings are installed externally and circumferentially immediately adjacent said at least one sleeve.

4. The air bearing assembly of claim 1 wherein said at least one sleeve comprises two half-sleeves installed in longitudinal abutting relationship externally and circumferentially about said composite cylindrical air bearing, one fore and one aft, over said composite cylindrical air bearing.

5. A rotary bell cup atomizer driven by a turbine mounted on a rotatable motor shaft supported within an air bearing assembly and contained within a housing, and including an external air supply for supplying air to actuate the turbine, said air bearing assembly comprising a composite cylindrical air bearing supporting said motor shaft, said composite cylindrical air bearing having alternating segmented porous carbon sections and nonporous carbon sections bonded together, and having at least one sleeve installed externally and circumferentially about said composite cylindrical air bearing, said sleeve having openings formed therein, therethrough and therearound such that said openings are adjacent said porous carbon sections and are oriented so as to be in longitudinal and circumferential registry with said adjacent porous carbon sections, wherein said housing includes air passageways for delivering said air into and through each said opening externally of said sleeve, and wherein said assembly includes "O"-rings installed circumferentially around said assembly, one at the distal end and one at the proximal end of said assembly, whereby air supplied to said assembly is delivered through said passageways, to and through said openings in said sleeve, and to and through said porous carbon sections of said composite cylindrical air bearing, and whereby, upon supplying sufficient air to actuate said turbine, to and through said passageways, and thence to and through said porous sections of said composite cylindrical air bearing, said rotatable turbine drives said motor shaft which is supported within said bearing assembly during rotation, and said "O"-rings provide vibration damping of said motor shaft during rotation.

6. The rotary bell cup atomizer of claim 5 wherein said "O"-rings are installed externally and circumferentially immediately adjacent said composite cylindrical air bearing.

7. The rotary bell cup atomizer of claim 5 wherein said "O"-rings are installed externally and circumferentially immediately adjacent said at least one sleeve.

8. The rotary bell cup atomizer of claim 5 wherein said at least one sleeve comprises two half-sleeves installed in longitudinal abutting relationship externally and circumferentially about said composite cylindrical air bearing, one fore and one aft, over said composite cylindrical air bearing.

9. The air bearing assembly of claim 1 wherein said at least one sleeve is constructed of stainless steel.

10. The air bearing assembly of claim 4 wherein said two half-sleeves are constructed of stainless steel.

11. The bell cup atomizer of claim 5 wherein said at least one sleeve is constructed of stainless steel.

12. The bell cup atomizer of claim 8 wherein said two half-sleeves are constructed of stainless steel.

* * * * *